United States Patent

Massaro

[19]

[11] Patent Number: 6,006,399
[45] Date of Patent: Dec. 28, 1999

[54] TELESCOPIC TUBULAR EXTENSION PARTICULARLY FOR ELECTRIC HOUSEHOLD APPLIANCES AND CLEANING MACHINES IN GENERAL

[75] Inventor: Michele Massaro, Noventa Padovana, Italy

[73] Assignee: Lindhaus S.r.l., Padua, Italy

[21] Appl. No.: 08/864,064

[22] Filed: May 28, 1997

[30] Foreign Application Priority Data

Jun. 12, 1996 [IT] Italy ................................... PD96A0154

[51] Int. Cl.$^6$ ....................................................... B60S 1/64
[52] U.S. Cl. ........................... 15/315; 15/144.4; 138/114; 138/120; 138/177; 285/298; 16/115; 403/109.5
[58] Field of Search ..................................... 138/120, 112, 138/114, 177, 178; 15/315, 414, 144.4; 285/302, 298; 16/115; 403/109, 108, 105, 104, 109.5, 109.1

[56] References Cited

U.S. PATENT DOCUMENTS

| | | | |
|---|---|---|---|
| 321,483 | 7/1885 | Burrows | 285/298 |
| 1,365,851 | 1/1921 | Reynolds | 403/109 |
| 4,079,965 | 3/1978 | Moughty et al. | 403/109 |
| 4,105,346 | 8/1978 | Gelinas | 403/104 |
| 4,653,142 | 3/1987 | Upton | 16/115 |
| 4,967,484 | 11/1990 | Nosek | 403/109 |
| 5,336,012 | 8/1994 | Newville | 16/115 |
| 5,417,511 | 5/1995 | Warden | 403/109 |

*Primary Examiner*—James F. Hook
*Attorney, Agent, or Firm*—Guido Modiano; Albert Josif

[57] ABSTRACT

A tubular extension, particularly for electric household appliances and cleaning machines in general, comprising at least two tubular elements telescopically associated with each other, a first one of these tubular elements being associated coaxially with a second one having a smaller cross-section and being slideable inside the first tubular element, one of these first and second tubular elements having at least one sliding portion whereat the outer or inner lateral surface is shaped so as to form at least one step, wherefrom the cross-section gradually increases radially and along a given peripheral arc, a longitudinal cavity being formed at the peripheral arc, and a tooth having a similar shape fitting snugly and reversibly in the cavity after sliding over a portion of the surface relative to the peripheral arc, the tooth being formed at the inner or outer surface of the other one of the first and second tubular elements on the side where mutual coupling occurs upon assembly. During the sliding of the first and second tubular elements with respect to each other, the tooth is adjacent to the corresponding step, which is thus adapted to form a stroke limiter.

11 Claims, 2 Drawing Sheets

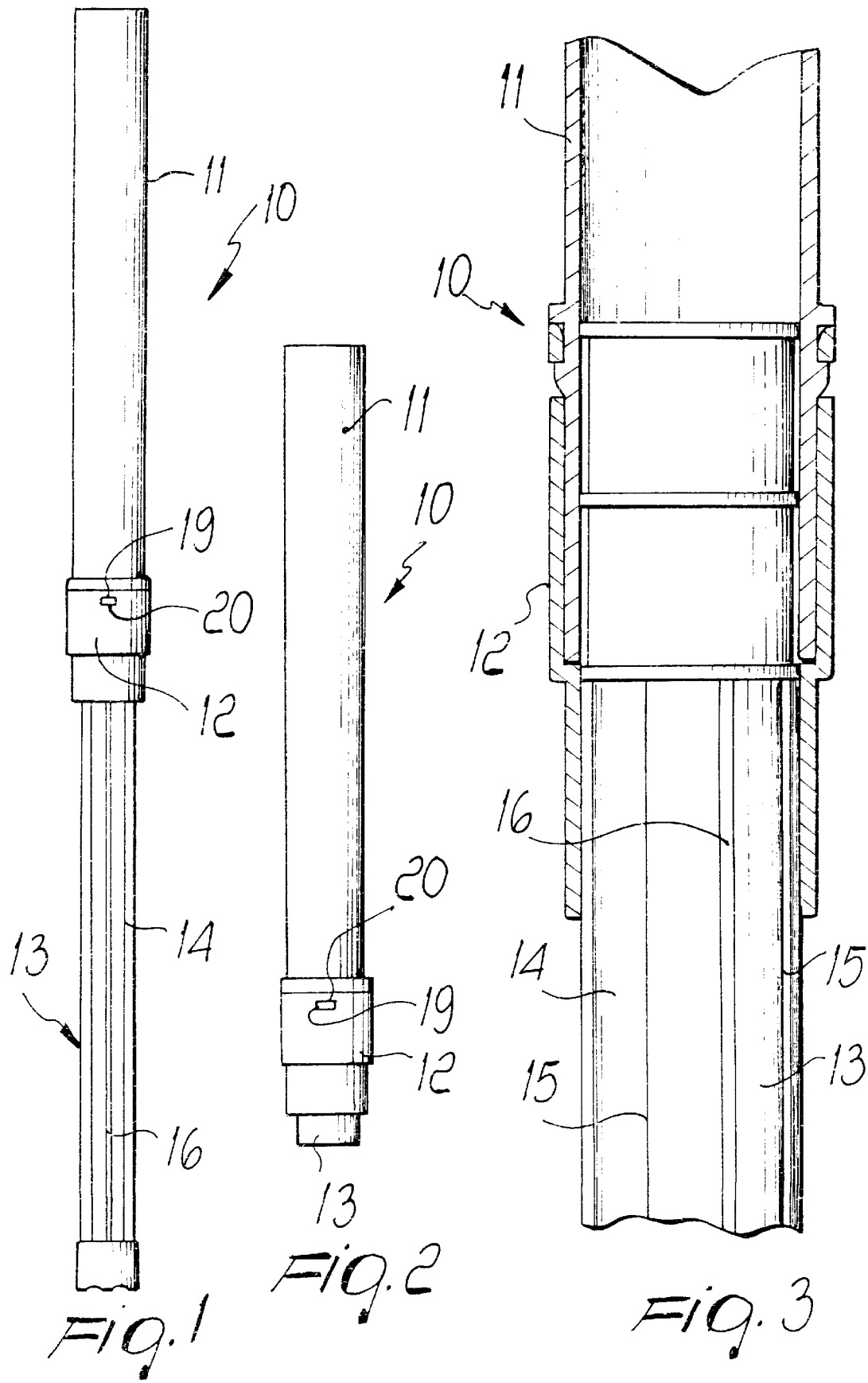

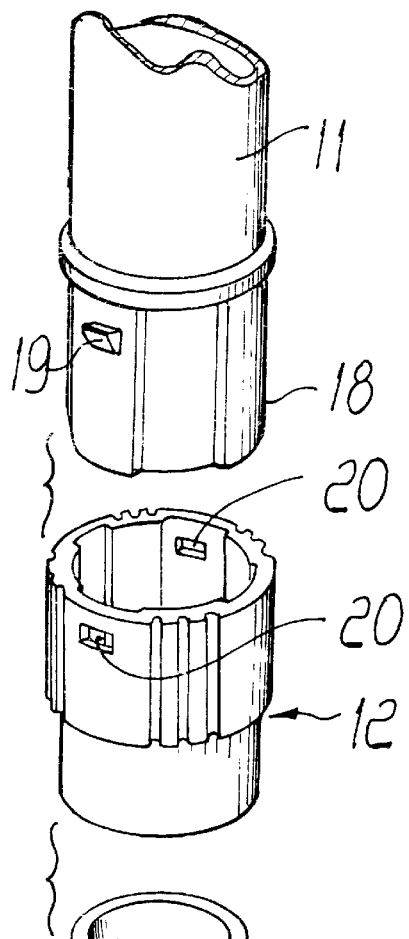
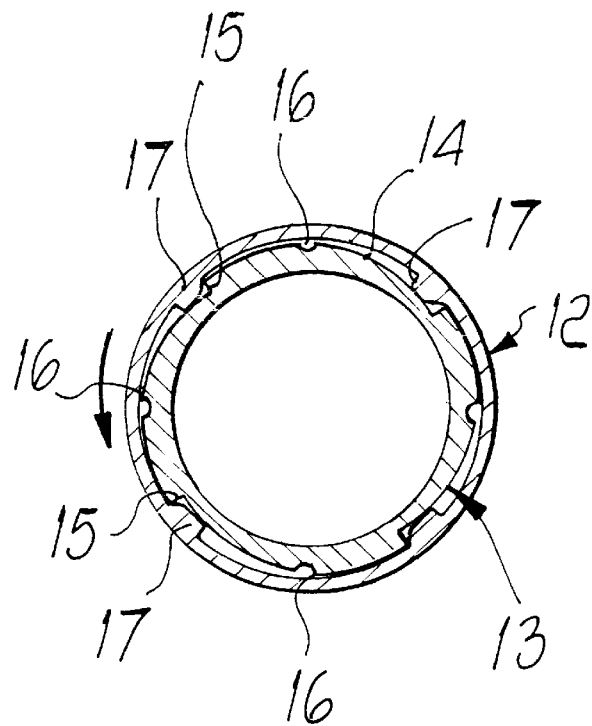
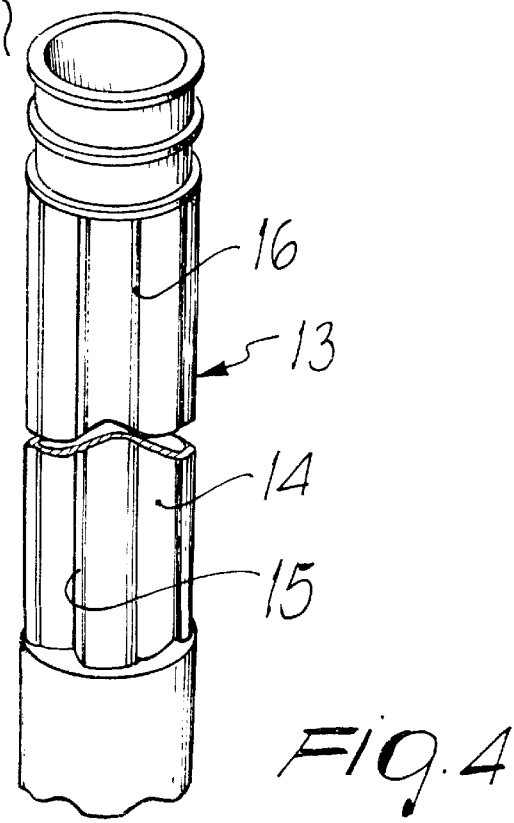
Fig. 4
Fig. 5
Fig. 6

TELESCOPIC TUBULAR EXTENSION PARTICULARLY FOR ELECTRIC HOUSEHOLD APPLIANCES AND CLEANING MACHINES IN GENERAL

BACKGROUND OF THE INVENTION

The present invention relates to a tubular extension particularly but not exclusively useful for electric household appliances and for cleaning machines in general.

It is known that electric household appliances for aspirating dust and liquids are currently particularly used and appreciated.

In particular, these electric household appliances, in order to be used advantageously and effectively, must allow a good working range without forcing the operator to change the power source, which is usually a mains outlet.

These electric household appliances must also have a structure which allows easy and ergonomic positions for the operator even in situations in which it is necessary to clean surfaces which are particularly difficult because of their location (consider for example the cleaning of a ceiling or of particularly hard to access corners, or floors whereon pieces of furniture are provided which have a fixed base or are in any case difficult to move).

In order to extend the working range of these electric household appliances, extensions are currently used which have substantially similar structures despite their differences in embodiment.

In particular, the solution which provides for the mutual insertion coupling of tubular segments which are interconnected by simple interlocking or by means of couplings, for example bayonet couplings, is particularly used in commercially available electric household appliances.

This solution with mutually insertion-coupled segments, though performing its function, is not free from drawbacks, the main one being the fact that the ducts are extended by preset segments the length whereof cannot be very limited since the operator might then be forced to assemble an excessively large number of segments, wasting time and producing structures which are not perfectly stable.

Telescopic extensions, in which the associated tubular elements are kept locked by pressing the free ends of threaded elements whose screwing and unscrewing movement produces length adjustment and allows actual use of the extension, are more rarely commercially available.

However, even this last solution entails drawbacks, one of which is a certain constructive complexity and a sometimes ineffective positional stability during use.

SUMMARY OF THE INVENTION

A principal aim of the present invention is to provide a tubular extension, particularly for electric household appliances and for cleaning machines in general, having a structure that allows great flexibility as regards the range of lengths it covers, at the same time ensuring extremely easy transition from the operating step to the adjustment step and viceversa.

Within the scope of this aim, an object of the present invention is to provide an extension which has a simple structure and which can be easily used even by a user having no technical knowledge.

Another object of the present invention is to provide an extension the execution whereof entails overall costs which are competitive with respect to conventional extensions.

Another object of the present invention is to provide an extension particularly adaptable to various electric household appliances.

Another object of the present invention is to provide an extension which can be manufactured with conventional technologies and can be easily assembled.

This aim, these objects, and others which will become apparent hereinafter are achieved by a tubular extension, particularly for electric household appliances and cleaning machines in general, which is characterized in that it comprises at least two tubular elements which are telescopically associated with each other, a first one of these tubular elements is coaxially associated with a second tubular element having a smaller cross-section and being slideable inside the first tubular element. One of the first and second tubular elements has at least one sliding portion having an outer or inner lateral surface which is shaped so as to form at least one step, from which the cross-section gradually increases radially and along a given peripheral arc. A longitudinal cavity is formed at the peripheral arc, and a tooth having a similar shape is fit snugly and reversibly in the cavity after sliding over at least one portion of the surface relative to the peripheral arc. The tooth is formed at the inner or outer surface of the other one of the first and second tubular elements on the side where mutual coupling occurs upon assembly, and the tooth is arranged, during the sliding of the first and second tubular elements with respect to each other, adjacent to the at least one step, which is thus adapted to form a stroke limiter.

BRIEF DESCRIPTION OF THE DRAWINGS

Further characteristics and advantages of the present invention will become apparent from the following detailed description of an embodiment thereof, illustrated only by way of non-limitative example in the accompanying drawings, wherein:

FIGS. 1 and 2 are side views of an extension having the structure according to the present invention during two operating steps;

FIG. 3 is a sectional view of part of the extension of FIG. 1;

FIG. 4 is an exploded view of the details of FIG. 3;

FIGS. 5 and 6 are sectional views of the extension of FIG. 1, respectively during adjustment and during use.

DESCRIPTION OF THE PREFERRED EMBODIMENTS

With particular reference to FIGS. 1 to 6, an extension particularly for electric household appliances and cleaning machines in general, having the structure according to the present invention, is generally designated by the reference numeral 10.

The extension 10 comprises two tubular elements having a longitudinal extension and being telescopically associated with each other: a first tubular element, designated by the reference numeral 11, is coaxially associated with a connecting element 12, which is also tubular, whilst a second tubular element, having a smaller cross-section than the first one and slideable therein, is generally designated by the reference numeral 13.

The second tubular element 13 has a sliding portion, designated by the reference numeral 14, having an outer lateral surface which is shaped so as to form four steps 15 having a similar shape, and having a transverse cross-section with respect to the longitudinal extension of the two tubular elements 11 and 13 which gradually increases in a radial direction starting from each one of these steps and along a corresponding given peripheral arc.

A respective cavity 16 is formed at a median region of the surface of each one of the peripheral arcs, and a respective tooth 17 snugly and reversibly fits therein after sliding on part of the surface of the corresponding peripheral arc. The tooth 17 has a shape similar to that of the cavity and is formed at the inner surface of the connecting element 12, in the part where the second tubular element 13 is inserted upon assembly. As seen in FIG. 3, the part of the connecting element 12 in which the second tubular element 13 is inserted has a smaller cross-section than the part in which the first tubular element 11 is inserted.

During the sliding of the first tubular element 11 and of the second tubular element 13 with respect to each other, each one of the four teeth 17 is adjacent to the corresponding step 15, such that each tooth 17 is thus adapted to constitute a stroke limiter and a partial guide for the corresponding step. As seen in FIG. 5, the side of each tooth 17 which faces the corresponding step 15 is chamfered.

The steps 15 have a substantially similar shape with respect to the sliding portion 14 and are arranged in a crosslike fashion, so that the corresponding peripheral arcs cover the entire perimeter of the cross-section of the sliding portion 14 of the second tubular element 13.

Moreover, the profile of the cross-section of each one of the peripheral arcs is substantially is spiral curve with respect to the longitudinal central axis of the sliding portion 14 of the second tubular element 13.

The first tubular element 11 has a coupling tang 18 which is splined and which can be inserted in an end the connecting element 12 having an inner surface which end is shaped substantially complementarily to the splined coupling tang 18.

Two teeth 19 also protrude from the tang 18 and are forced, upon assembly, into corresponding through holes 20 formed in the connecting element 12.

In practice, operation is as follows: when the operator is adjusting the length of the extension 10, he appropriately rotates the first tubular element 11 and the second tubular element 13 with respect to each other, so that each one of the teeth 17 is adjacent to a corresponding step 15.

In this manner, the recess formed by the steps 15 allows the sliding of the tubular element 11 and of the tubular element 13 with respect to each other.

Once the optimum length of the operation to be performed has been determined, a rotation of the first tubular element 11 and of the second tubular element 13 with respect to each other in the opposite direction causes the teeth 17 to be pushed out by the action of the surface on which they slide.

The outward thrust of the teeth 17 causes the connecting element 12 to undergo elastic deformations (FIG. 6) which produce a counterthrust ensuring locking of the teeth 17 inside the cavities 16 when the teeth 17 reach the cavities 16.

In this condition, the extension 10 is in a stable condition which is sufficient to ensure usability of the extension and therefore of the electric household appliance.

The teeth 17 disengage from the cavities 16 by slight forcing, which is facilitated by the chamfered shape of one of the two sides of each one of the teeth 17.

In practice, it has been observed that the present invention has solved the intended aim and objects: in particular, it should be noted that the extension having the structure according to the present invention allows a transition from the adjustment step to the working step which is very simple and easy to perform even for operators lacking particular technical knowledge.

It should also be noted that the extension is particularly stable during operation, allowing optimum functionality of the electric household appliance with which it is associated.

The flexibility of the applicability of the structure of the extension according to the present invention, which can advantageously be applied to various electric household appliances, should also be noted.

The structural simplicity of the extension according to the present invention, which can be manufactured at competitive costs with respect to conventional extensions, should also be noted.

The present invention is susceptible of numerous modifications and variations, all of which are within the scope of the inventive concept.

All the details may also be replaced with other technically equivalent elements.

The materials and the dimensions may be any according to requirements.

What is claimed is:

1. A tubular extension for electric household appliances and cleaning machines, comprising:

two tubular elements having a longitudinal extension being telescopically connected with each other, a first tubular element of said two tubular elements being coaxially telescopically connected with a second tubular element of said two tubular elements, with said second tubular element being slidingly inserted in said first tubular element;

a sliding portion being provided at a first one of said first and second tubular elements, said sliding portion being shaped so as to form at least one step and to have a transverse cross-section with respect to said longitudinal extension which gradually increases radially along a peripheral arc surface of said sliding portion;

at least one longitudinal cavity being formed at said peripheral arc surface of said sliding portion;

at least one protruding tooth being formed at a second one of said first and second elements for being engaged in said at least one cavity of said sliding portion in a use configuration of said extension in which said first and second tubular elements are stably mutually connected, said at least one tooth being arranged adjacent to said at least one step for acting as a stroke limiter in an adjustable configuration of said extension for allowing said first and second tubular elements to be slideable with respect to each other in a direction of said longitudinal extension, and said at least one tooth sliding over at least part of said peripheral arc surface when said first tubular element is rotated with respect to said second tubular element from said adjustable configuration to said use configuration whereupon said at least one tooth is removably and snugly fit in said at least one cavity;

said first tubular element having a tubular connecting element in which said second tubular element is slidably inserted, said second element having said sliding portion and said tooth being formed at an inner surface of said connecting element in which said sliding portion of said second tubular element is inserted.

2. The extension of claim 1, wherein said first tubular element has a splined tang, said tang being inserted in said connecting element at an insertion region of said connecting element, said connecting element comprising at said insertion region an internal surface which is shaped complementarily to said splined tang.

3. The extension of claim 2, wherein said first tubular element has, at said tang, at least two connecting teeth, said at least two connecting teeth being adapted to fit and lock within corresponding through holes formed in said connecting element for connecting said connecting element to said first tubular element.

4. A tubular extension for electric household appliances and cleaning machines, comprising:

two tubular elements having a longitudinal extension being telscopically connected with each other, a first tubular element of said two tubular elements coaxially telescopically connected with a second tubular element of said two tubular elements, with said second tubular element being slidingly-inserted in said first tubular element;

a sliding portion being provided at a first one of said first and second tubular element, said sliding portion being shaped so as to form at least one step and to have a transverse cross-section with respect to said longitudinal extension which gradually increases radially along a peripheral arc surface of said sliding portion;

at least one longitudinal cavity being formed at said peripheral arc surface of said sliding portion;

at least one protruding tooth being formed at a second one of said first and second element for being said at least one cavity of said sliding portion in a use configuration of said extension in which said first and second tubular elements are stably mutually connected, said at least one tooth being arranged adjacent to said at least one step for acting as a stroke limiter in an adjustable configuration of said extension for allowing said first and second tubular elements to be slideable with respect to each other in a direction of said longitudinal extension, and said at least one tooth sliding over at least part of said peripheral arc surface when said first tubular element is rotated with respect to said second tubular element from said adjustable configuration to said use configuration whereupon said at least one tooth is removably and snugly fit-in said at least one cavity;

the extension comprising a plurality of steps with plurality of corresponding peripheral arc surfaces which are shaped so as to form gradual increases in cross-section each starting from a corresponding one of said steps, said plurality of peripheral arc surfaces extending about the entire circumference of said sliding-portion.

5. The extension of claim 4, wherein each of said peripheral arc surfaces has a transverse cross-section which is shaped like a spiral curve with respect to a longitudinal central axis of the extension.

6. The extension of claim 4, wherein each one of said steps has a shape corresponding to that of said sliding portion.

7. A tubular extension for electric household appliances and cleaning macheine comprising:

two tubular elements having a longitudinal extension being telescopically connected with each other, a first tubular element of said two tubular elements being coaxially telescopically connected with a second tubular element of said two tubular elements- with said second tubular element inserted in said first tubular element;

a sliding portion being provided at a first one of said first and second tubular elements, said sliding portion being shaped so as to form at least one step and to have a transverse cross-section with respect to said longitudinal extension which gradually increases radially aong a peripheral arc surface of said sliding portion;

at least one longitudinal cavity being formed at said peripheral arc surface of said sliding portion;

at least one protruding tooth being formed at a second one of said first and second elements for being engaged in said at least one cavity of said sliding portion in a use configuration of said extension in which said first and second tubular elements are stably mutually connected said at least one tooth being arranged adjacent to said at least one step for acting as a stroke limiter in an adjustable configuration of said extension for allowing said first and second tubular elements to be slideable with respect to each other in a direction of said longitudinal extension, and said at least one tooth sliding over at least part of said peripheral arc sur face when said first tubular element is rotated with respect to said second tubular element from said adjustable configuration to said use configuration whereupon said at least one tooth is removably and snugly fit in said at least one cavity;

said at least one tooth having a chamfered lateral surface directed towards said at least one step, said chamfered surface facilitating disengagement from said at least one cavity when said first tubular element is rotated with respect to said second tubular element out of said use configuration.

8. A tubular extension comprising:

a first tubular element;

a second tubular element which is inserted within said first tubular element such that said second tubular element may freely slide with respect to said first tubular element in a direction corresponding to a longitudinal extension of the tubular extension when the tubular extension is in a length adjustable configuration, and such that said second tubular element may be rotated with respect to said first tubular element out of said length adjustable configuration and into a use configuration of the tubular extension in which said first and second tubular elements are stably mutually connected and blocked from mutually sliding in the longitudinal direction;

an inner surface of said first tubular surface and an outer surface of said second tubular element, said inner and outer surfaces mutually facing each other;

an arc-shaped surface portion provided on a first one of said inner and outer surfaces, said arc-shaped surface portion having a gradually increasing radius with respect to a central longitudinal axis of the tubular extension from a minimum radius portion to a maximum radius portion of said arc-shaped surface portion;

a groove element provided in said arc-shaped surface portion; and a tooth element provided on a second one of said inner and outer surfaces, said tooth element protruding from said second one of said inner and outer surfaces such that when the tubular extension is in said length adjustable configuration said tooth element is arranged adjacent said minimum radius portion of said arc-shaped surface portion for allowing said second tubular element to be freely slideable with respect to said first tubular element in the longitudinal direction, and such that said tooth is elastically engaged in said groove element when the tubular extension is in said use configuration for stably mutually connecting said first and second tubular elements;

said groove element extending substantially in said arc-shaped surface portion in a direction which is substantially parallel to said central longitudinal axis of the tubular extension such that said second tubular element may be rotated with respect to said first tubular element out of said length adjustable configuration when said tooth element is arranged adjacent any position of said minimum radius portion of said arc-shaped surface portion for subsequently positioning said tooth element in a selected one of any position in said groove element in said use configuration of the tubular extension.

9. The tubular extension of claim 8, further comprising a step element arranged adjacent said minimum radius portion of said arc-shaped surface portion for acting as a rotation stroke limiter.

10. The tubular extension of claim 8, comprising a plurality of said arc-shaped portions provided on said first one of said inner and outer surfaces, a plurality of tooth elements provided on said second one of said inner and outer surfaces, and a plurality of said groove elements each provided in a respective arc-shaped surface portion of said plurality of said arc-shaped portions.

11. The tubular extension of claim 10, wherein said plurality of arc-shaped portions extend successively about the entire circumference of said first one of said inner and outer surfaces, said minimum radius portion of a respective one of said arc-shaped portions being arranged adjacent said maximum radius portion of a successive one of said arc-shaped portions so as to define a plurality of step elements for acting as rotation stroke limiters.

* * * * *